US009873222B2

(12) United States Patent
Blochmann

(10) Patent No.: US 9,873,222 B2
(45) Date of Patent: Jan. 23, 2018

(54) BLOW MOULDING MACHINE WITH BLOW MOULD CHANGING ROBOT WITH ADDITIONAL TREATMENT FUNCTION

(71) Applicant: KRONES AG, Neutraubling (DE)

(72) Inventor: Erik Blochmann, Neutraubling (DE)

(73) Assignee: KRONES AG (DE)

( * ) Notice: Subject to any disclaimer, the term of this patent is extended or adjusted under 35 U.S.C. 154(b) by 302 days.

(21) Appl. No.: 14/541,309

(22) Filed: Nov. 14, 2014

(65) Prior Publication Data

US 2015/0145178 A1 May 28, 2015

(30) Foreign Application Priority Data

Nov. 26, 2013 (DE) .................. 10 2013 113 077

(51) Int. Cl.
*B29C 49/30* (2006.01)
*B29C 49/48* (2006.01)
(Continued)

(52) U.S. Cl.
CPC ............ *B29C 49/30* (2013.01); *B29C 31/006* (2013.01); *B29C 49/4273* (2013.01);
(Continued)

(58) Field of Classification Search
CPC ..... B29C 31/006; B29C 33/306; B29C 49/30; B29C 49/36; B29C 49/4205;
(Continued)

(56) References Cited

U.S. PATENT DOCUMENTS

| 5,302,105 A | 4/1994 | Bertleff .................... 425/190 |
| 8,424,359 B2 | 4/2013 | Theis et al. .................... 72/420 |

(Continued)

FOREIGN PATENT DOCUMENTS

| AT | 503196 | 8/2007 | ............ B21D 43/24 |
| CN | 102029706 | 4/2011 | ............ B29C 49/42 |

(Continued)

OTHER PUBLICATIONS

Chinese Office Action issued in application No. 201410650155X, dated Apr. 29, 2016 (30 pgs).
(Continued)

*Primary Examiner* — Robert B Davis
(74) *Attorney, Agent, or Firm* — Hayes Soloway P.C.

(57) ABSTRACT

A system for transforming plastic parisons to plastic containers with a transport device which transports the plastic parisons along a predetermined transport path, wherein the transport device has a movable station support disposed at least indirectly on a stationary base support on which a plurality of transforming stations is disposed. The transforming stations each have blow mold devices which each form cavities within which the plastic parisons can be transformed into the plastic containers and these blow mold devices are each disposed on blow mold supports. The system has a changing device which is suitable and intended in order, in a changing mode of the system, at least to remove the blow mold devices from their blow mold supports and/or to dispose blow mold devices on the blow mold supports, and wherein, during a further mode of operation which differs from the changing mode, this changing device is suitable and intended for carrying out a treatment operation on at least one working element intended for the system.

10 Claims, 8 Drawing Sheets

(51) Int. Cl.
  *B29C 31/00* (2006.01)
  *B29C 49/42* (2006.01)
  *B29C 49/06* (2006.01)
  *B29C 49/36* (2006.01)
  *B29C 49/46* (2006.01)
  *B29C 49/00* (2006.01)
  *B29K 105/00* (2006.01)
  *B29L 31/00* (2006.01)

(52) U.S. Cl.
  CPC .............. *B29C 49/48* (2013.01); *B29C 49/06* (2013.01); *B29C 49/36* (2013.01); *B29C 49/4205* (2013.01); *B29C 2049/0094* (2013.01); *B29C 2049/4694* (2013.01); *B29C 2049/4858* (2013.01); *B29C 2049/4892* (2013.01); *B29K 2105/253* (2013.01); *B29L 2031/712* (2013.01)

(58) Field of Classification Search
  CPC ................ B29C 49/4273; B29C 49/48; B29C 2049/0094; B29C 2049/4858; B29C 2049/4856; B29C 2049/4892; B29C 2049/4694
  See application file for complete search history.

(56) References Cited

U.S. PATENT DOCUMENTS

| | | | |
|---|---|---|---|
| 8,505,268 B2 | 8/2013 | Stoiber et al. | 53/55 |
| 8,770,957 B2 | 7/2014 | Laumer | 425/73 |
| 8,807,980 B2 | 8/2014 | Meinzinger et al. | 425/186 |
| 8,974,211 B2 | 3/2015 | Cirette et al. | 425/182 |
| 9,375,878 B2 | 6/2016 | Hahn et al. | 700/204 |
| 2006/0290034 A1 | 12/2006 | Sideris | 264/537 |
| 2010/0269555 A1 | 10/2010 | Theis et al. | 72/4 |
| 2011/0061690 A1 | 3/2011 | Seger | 134/137 |
| 2013/0040009 A1* | 2/2013 | Laumer | B29C 49/46 425/182 |
| 2014/0004219 A1 | 1/2014 | Cirette et al. | 425/188 |
| 2014/0305076 A1 | 10/2014 | Winzinger | 52/201 |
| 2015/0151455 A1 | 6/2015 | Cirette et al. | B29C 31/006 |

FOREIGN PATENT DOCUMENTS

| | | | |
|---|---|---|---|
| CN | 103402735 | 11/2013 | ............ B29C 31/00 |
| DE | 10 2009 040 978 | 3/2011 | ............ B65G 1/12 |
| DE | 102009040977 | 3/2011 | ............ B65B 57/00 |
| DE | 102010033171 | 2/2012 | ............ B29C 49/42 |
| DE | 102011052574 | 2/2013 | ............ B29C 49/42 |
| DE | 102011054890 | 5/2013 | ............ B65B 59/04 |
| EP | 0 411 970 | 5/1990 | ............ A61L 2/10 |
| EP | 0513951 | 11/1992 | ............ B29C 45/17 |
| EP | 2292402 | 3/2011 | ............ B29C 49/42 |
| FR | 2990639 | 11/2013 | ............ B29C 49/42 |
| WO | WO2012120031 | 9/2012 | ............ B29C 31/00 |
| WO | WO 2013/060549 | 5/2013 | ............ B67C 3/22 |

OTHER PUBLICATIONS

European Search Report (no translation) issued in application No. 16157101.3, dated May 20, 2016 (9 pgs).
European Search Report issued in application No. 14194892.7, dated May 8, 2015 (7 pgs).
Extended European Search Report issued in application No. 14194986.7, dated May 8, 2015 (6 pgs).
German Search Report issued in corresponding German Patent Appln. No. 10 2013 113 077.1 dated Nov. 6, 2014 (7 pgs).
German Search Report (no translation) issued in application No. 10 2013 113 076.3, dated Nov. 5, 2014 (6 pgs).
German Search Report (no translation) issued in application No. 10 2013 113 074.7, dated Nov. 17, 2014 (7 pgs).
Official Action issued in U.S. Appl. No. 14/541,373 dated Sep. 12, 2016 (38 pgs).
Office Action issued in U.S. Appl. No. 14/541,373, dated May 10, 2017 (11 pgs).
Chinese Third Office Action issued in application No. 2014106501920, dated Dec. 14, 2016 (39 pgs).
EPO Communication issued in corresponding EPO Patent Appln. Serial No. 14,194,986.7-1706 dated Jul. 14, 2017, with English translation (11 pgs).
Chinese Office Action issued in application No. 2014106831511, dated May 4, 2016 (29 pgs).

* cited by examiner

Fig. 1
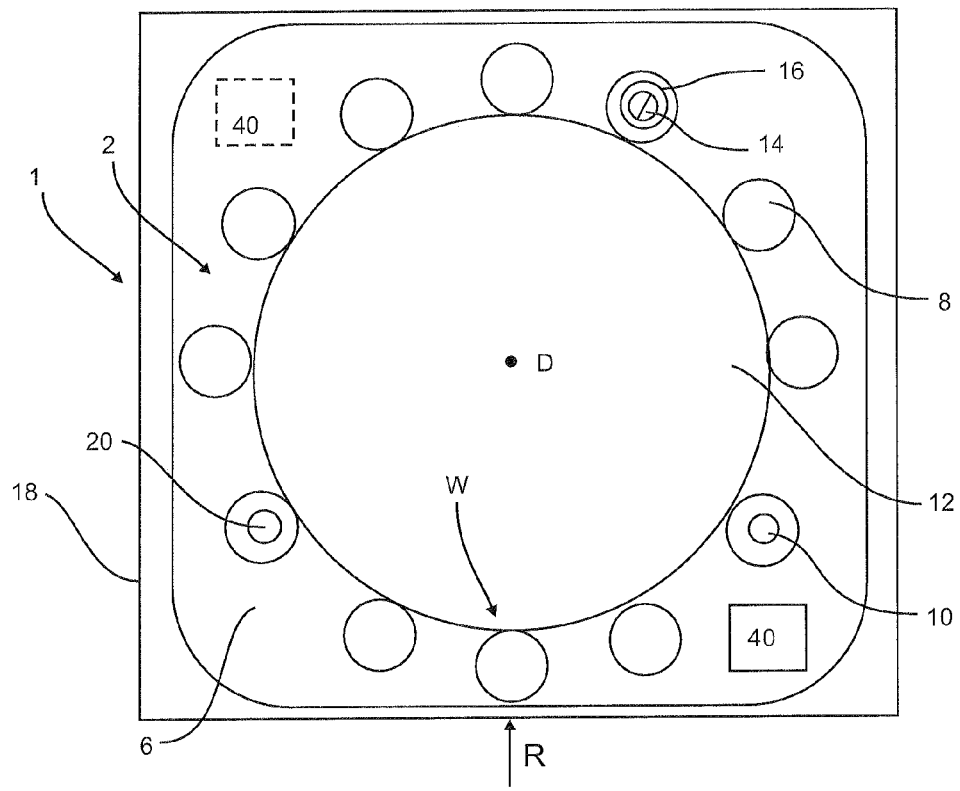
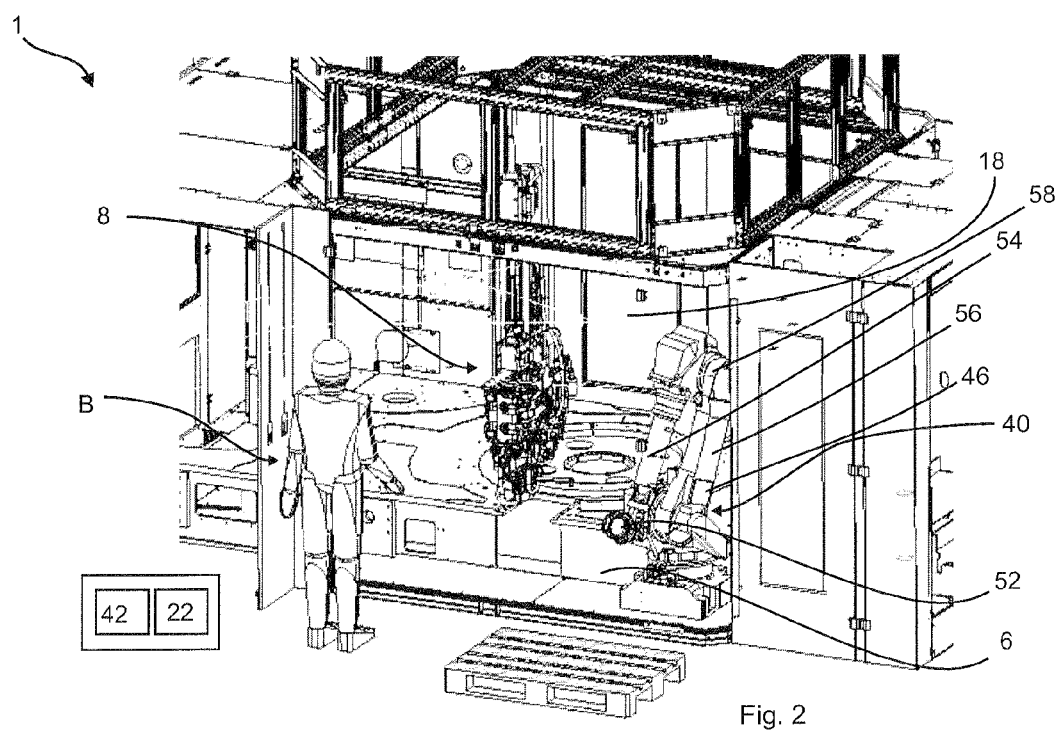
Fig. 2

BLOW MOULDING MACHINE WITH BLOW MOULD CHANGING ROBOT WITH ADDITIONAL TREATMENT FUNCTION

BACKGROUND OF THE INVENTION

The present invention relates to a system for transforming plastic parisons into plastic containers. Such systems have been known for a long time from the prior art. In this case heated plastic parisons are usually transformed by the application of compressed air into plastic containers such as plastic bottles. For this purpose a plurality of transforming stations or blow stations are usually disposed on a rotatable carrier. In this case these blow stations each have blow moulds which have a hollow space within which the plastic parisons are transformed into the plastic containers. Thus these blow moulds have a negative of the container to be produced.

If the system is to be changed over to other containers, the individual blow moulds must be replaced. In the prior art these blow moulds are removed individually from the respective transforming stations. In this case an operator takes the individual blow mould devices out and replaces them with new blow mould devices which are intended to form the corresponding new containers. Therefore the changing process lasts a relatively long time and an operator is also necessary. Furthermore the use of a changing device or a changing robot is known from the internal prior art. However, such a changing device is relatively complicated and also expensive.

The object of the present invention therefore is to use such changing devices more efficiently, in order to use them in a more economically viable manner.

SUMMARY OF THE INVENTION

A system according to the invention for transforming plastic parisons into plastic containers has a transport device which transports the plastic parisons along a predefined transport path. In this case the transport device has a movable station support disposed at least indirectly on a stationary base support on which a plurality of transforming stations is disposed, wherein these transforming stations each have blow mould devices which each form cavities within which the plastic parisons can be transformed into the plastic containers. In this case these blow mould devices are each disposed on blow mould supports. These blow mould supports are preferably components of the individual transforming stations and thus are preferably likewise indirectly disposed on the station support.

According to the invention the system has a changing device which is suitable and intended in order, in a changing mode of the system, at least to remove the blow mould devices from their blow mould supports and/or to dispose blow mould devices on the blow mould supports. Furthermore, during a further mode of operation which differs from the changing mode, this changing device is suitable and intended for carrying out a treatment operation on at least one working element intended for the system. However, it would also be conceivable for the changing device to be used for changing further components, such as for example stretching rods, transfer starwheels and the like.

Therefore according to the invention it is proposed that the changing device serves not only for changing blow moulds, but in particular at different times can also undertake other tasks, such as for example the cleaning or maintenance of components such as for example blow moulds. Thus for example it is possible for the changing device, which may be in particular, but not exclusively, a robot, to be able for example to carry out cleaning and maintenance work, for example on dismantled blow moulds during the container production.

This is advantageous in particular when frequent changes of blow moulds must be carried out. As mentioned, the changing device is preferably a semi-automatic and preferably fully automatic robot. However, a manual changing device may also be provided. Thus it would be possible for example that a so-called manipulator is used instead of a robot. A manipulator compensates for the dead weight of a workpiece to be moved, such as for instance a blow mould, in order to simplify the operation. The operator can guide the manipulator which has the mould gripper fastened on its end. Such a change by means of a manipulator is not automatically carried out or is carried out without an operator. It is pointed out that the configuration of the changing device as a manipulator can also be used irrespective of whether the changing device also carries out other activities outside the changing mode.

The applicant therefore reserves the right also to claim protection for the embodiment of a changing device as a so-called manipulator or a component to be operated by persons. Such a manipulator has lower production costs by comparison with a robot.

It is also pointed out that the changing device can also be used for tasks which do not directly concern the transforming device, for instance for cleaning operations on filling elements of a filler.

In addition there is usually also no need for a demarcation zone in order to accommodate this manipulator or robot. In addition, the technology for such a manipulator is simpler and more cost-effective and is suitable for example for countries with lower technical standards.

Nevertheless, however, such a manipulator also makes it possible to replace the blow mould device as a set, that is to say in particular including all the parts of the blow mould. Thus here too a quick and ergonomic change is possible.

Moreover, however, the further components of such a changing device can remain the same, such as for example the moulds, the magazine, the blow station and the actuator. Such a manipulator offers the advantage that it can be converted without great expense and in particular can also be aimed at customers who require a quick change without an automatic changing device.

For equipping a magazine with the blow moulds, the blow moulds can for example be pushed as a set once only by an operator into corresponding openings. Since such a mould set of a blow mould preferably has no handles or the like and the three components (mould halves and base) are not fixed to one another, this is generally difficult to carry out without a suitable tool. For this task the operator can use a simple tool which simulates the gripper head of the robot in order to grip the mould set. A secure hold is preferably ensured by means of a form and force fit connection.

In a further advantageous embodiment, therefore, the changing device has a gripping device for gripping the blow mould device, wherein this gripping device is movable in at least two different directions. Advantageously this gripping device can swivel about at least three different axes. It can advantageously swivel about six axes.

The gripping device is preferably disposed on an arm, wherein this arm is likewise movable. Advantageously the gripping device can be separated from this arm, particularly preferably automatically. In this case it is additionally possible for media connections also to be separated automatically.

Due to the invention it is possible, in the specific mode of operation and in particular during the production of the blow moulding machine for the changing device, to carry out an activity necessary for the next changing operation, for example cleaning of the blow moulds or loading of the magazine.

In a further advantageous embodiment the changing device has at least one treatment device for treating the working element. This may for example be a cleaning element which serves for cleaning said working element. This cleaning element can for example have a nozzle which serves for supplying a surface of the working element with a cleaning and or sterilising medium. In addition the treatment device can also have a sterilising device, for instance a supply device which supplies the working element with a sterilising medium or also a radiation device which exposes the working element to radiation in order to sterilise it.

Therefore the above-mentioned mode of operation is preferably a production mode of the system. Thus here it is proposed that during a working operation of the installation, that is to say during an operation in which containers are manufactured, the changing device performs other activities simultaneously.

In a further advantageous embodiment the treatment operation is selected from a group of treatment operations which includes cleaning operations, maintenance operations, sterilising operations, combinations thereof and the like.

In a further advantageous embodiment the working element is selected from a group of working elements which includes blow moulds, gripping elements, holding mandrels for holding the containers, stretching rods, blow moulding dies, filling valves and the like. In a further preferred embodiment said working element likewise serves for treatment of the containers. Thus this may be one of the above-mentioned working elements which for example grips the container or treats it in some other way, such as for instance filling it, expanding it in the longitudinal direction (stretching rod), or the like.

In a further advantageous embodiment the treatment device can be replaced by the gripping device. This means that both the gripping device and also the treatment device can be disposed on the same arm. In this case it is possible for the gripping device to be replaced by the treatment device or vice versa, in order to carry out the respective operations. In other words it is possible for a mould gripper on a robot arm to be replaced by a treatment device. However, it would be possible for both a mould gripper and also a treatment device to be disposed on the robot arm, and these can for example be exchanged for one another by a specific movement. Thus for example it is possible for the changing device to set down a gripping device and attach a working device—preferably autonomously—to the corresponding interface in order to carry out this action.

Cleaning of the blow mould devices preferably takes place by means of the changing device.

In a further preferred embodiment the changing device places the moulds for cleaning in an assembled state into a cleaning system.

In a further advantageous embodiment a corresponding cleaning system dismantles the assembled blow mould devices in order to facilitate all-round cleaning.

In a further advantageous embodiment it is also possible for the gripping device to be connected to the changing device or the robot mechanically and in particular without operator intervention (preferably form-fit). Advantageously, during or at the time of this connection media such as for example compressed air and control signals can be simultaneously connected.

It is also possible that for manual loading and unloading of a magazine with the blow mould devices a handling tool is used which is designed according to the principle of a smooth gripper.

In a further advantageous embodiment it is also possible for the changing device to have elements which on insertion of a blow mould and also preferably on removal of a blow mould device connect or disconnect, preferably automatically, media which are necessary for temperature regulation of the blow mould device.

In this case it is possible for the changing device to change a gripper head for connecting or disconnecting these media.

In a further advantageous embodiment it would also be possible for media to be connected or disconnected during an insertion movement of the blow mould device into the blow mould support by the changeover device.

In this case such connections are preferably oriented so that an insertion movement and also the connecting and disconnecting movement take place substantially parallel to a stretching rod of the system. In this way the connection and disconnection operations are made easier.

In a further advantageous embodiment the system has an operating device for operating the changing device. This operating device advantageously has a touch screen and preferably also a robot controller. Preferably these said devices are used by a plurality of machines and they are preferably attached to one another via a standard interface.

In a further advantageous embodiment the gripping device is disposed on an arm which can swivel about at least one predetermined swivel axis. In this way the capability of movement of the gripping device is increased.

In a further advantageous embodiment the system has a housing which at least partially surrounds at least the station support and the blow mould device and the changing device is preferably disposed outside this housing. This housing also serves in particular as protection for the operator. However, in order that the changing device can also carry out other activities within the mode of operation, the changing device is preferably disposed outside this housing. In this case the changing device preferably has opening and closing devices which can open this housing, in particular in order to replace blow moulds after a working operation. Thus it is preferably possible that the changing device opens and closes the machine protection of the blow moulding machine, in particular for the mould changing operation. In this case this protection region preferably has an opening element which can be gripped by the gripping device of the changing device for opening and closing the protection region.

Thus for example a counterpart which can be gripped by the gripping device can be disposed on a door of the protection region.

In a further advantageous embodiment the system also has a protection region for the changing device. This protection region can at least partially surround the changing device during the change of blow mould and can also surround the changing device at least intermittently outside the changing mode.

Furthermore the present invention is directed to a method for operating a transforming device for transforming plastic parisons into plastic containers, wherein in a working operation of the system the plastic parisons are transported by means of a plurality of transforming stations along a predetermined transport path and are expanded by application of a flowable and in particular gaseous medium to form the plastic containers. Furthermore for expanding the plastic parisons blow mould devices are used, in the interior of which the plastic parisons are expanded to form the plastic containers. Furthermore in a changing mode of the system at least one of the blow mould devices of the system is removed and/or one of the blow mould devices is disposed on a blow mould support of the system.

According to the invention, for changing the blow mould devices a changing device is used which has a gripping device for gripping the blow mould device, wherein in a further mode of operation this changing device carries out a further treatment operation. Advantageously this further mode of operation is a working operation of the system, in which plastic parisons are also expanded to form plastic containers.

Additionally or alternatively it would also be possible for the changing device to be designed as a manual changing device, in particular as a manipulator. By means of such a manipulator the user can also, as mentioned above, carry out manual changing operations, although for this purpose he has to employ significantly lower forces than for a purely manual changing operation.

In a further advantageous embodiment the changing device is designed in the manner described above, wherein for example preferably at least intermittently a gripping device of the changeover device is replaced by a treatment device for treatment. Advantageously this replacement likewise takes place automatically.

As mentioned above, the treatment operation is preferably a cleaning and/or sterilisation operation. In this case, as mentioned above, not only can a blow mould device be treated, but also other elements such as for instance stretching rods, blow moulding dies, filling devices and the like.

In a further advantageous embodiment the gripping device is disposed on an arm which can swivel about a predetermined swivel axis. This arm is also designated below as a second arm because of its arrangement in the changing device. In this case the gripping device itself can in turn be disposed so that it can swivel or rotate on this arm.

In a further advantageous embodiment the swiveling (second) arm is disposed on a further arm which can swivel about a predetermined second swivel axis. This further arm is also designated below as a first arm because of its arrangement in the changing device. In this case the first swivel axis is advantageously not parallel to the second swivel axis and particularly preferably is oblique in the mathematical sense. Two degrees of freedom of movement of the gripping device can already be achieved by these two axes.

Advantageously the gripping device is disposed so as to swivel on the second arm. This swiveling arrangement facilitates a further degree of freedom of movement. Advantageously the gripping device can swivel about two axes with respect to the second arm, for example about an axis which extends in the direction of this arm and also about an axis perpendicular thereto.

Thus the gripping device can advantageously pivot with respect to at least two axes which are disposed perpendicular relative to one another on the first arm.

The gripping device can preferably swivel with respect to at least four axes, preferably with respect to at least five swivel axes and preferably with respect to at least six swivel axes.

Preferably at least one of these (geometric) swivel axes is stationary. This stationary swivel axis is preferably oriented vertically. Preferably at least one axis is always disposed in a spatially fixed plane, i.e. independently of a position of the changing device and/or the gripping device. This spatially fixed plane is preferably a horizontal plane. Preferably at least two axes are always disposed in a spatially fixed plane, i.e. independently of a position of the changing device and/or the gripping device.

Preferably at least a pair of axes are provided which are always perpendicular to one another, i.e. independently of a position of the changing device and/or the gripping device. The first arm is preferably movable with respect to these two swivel axes relative to an (in particular stationary) support.

Preferably at least one further pair of axes are provided which are always perpendicular to one another, i.e. independently of a position of the changing device and/or the gripping device. The second arm is preferably movable with respect to these two swivel axes relative to the first arm.

Preferably at least one further pair of axes are provided which are always perpendicular to one another, i.e. independently of a position of the changing device and/or the gripping device. The gripping device is preferably movable with respect to these two swivel axes relative to the second arm.

The arrangement described here of the (geometric) swivel axes is suitable in special manner in order to facilitate a substantial freedom of movement of the gripping device.

Preferably at least two swivel axes are always disposed parallel to one another, i.e. independently of a position of the changing device and/or the gripping device.

In a further advantageous embodiment the gripping device has an engaging means in order to grip at least one projection disposed on the blow mould device. Advantageously the gripping device has two engaging means in order to grip two projections disposed on the blow mould device. In this case such a projection can be disposed on each of the two blow mould parts and the gripping device can engage behind this during the transport in order thus to be able to hold the blow mould device together in its entirety.

In a further advantageous embodiment the second arm can swivel with respect to the first arm about at least two swivel axes. These swivel axes are advantageously perpendicular to one another.

In a further advantageous embodiment the gripping device can be connected positively and/or form-fit to the blow mould device. In this way secure gripping and transporting of the blow mould devices may be enabled by means of the changing device, wherein transporting at higher speeds is also possible.

In a further advantageous embodiment the gripping device has a passive gripping element. This is understood in particular to mean that the blow mould device is not held by an active gripping movement of the gripping element, for instance by a clamping movement, but merely by a correct positioning of the gripping element or the gripping device relative to the blow mould device to be transported. Thus in particular an element of the gripping device can engage behind a section of the blow mould device.

In addition it is also possible that the gripping device has a magnetic or magnetisable element in order to hold the blow mould device. Thus the gripping device could for instance have an electromagnet which can be activated as soon as the gripping device is located in a predetermined position relative to the blow mould device. Also a magnetic hold between parts of the blow mould device could be initiated by the gripping device.

In a further advantageous embodiment the changing device has a control device which carries out a removal of the blow mould device from the blow mould supports and/or an arrangement of the blow mould device on the blow mould supports both in a force-controlled and a path-controlled manner. In this case detecting devices can be provided which detect a movement, in particular of the gripping device, and detecting devices can also be provided for measuring forces.

Due to this control it is also possible to define one or more reference points on the blow station and/or the magazine which can be approached. In this way the exact geometric position of the blow mould device can also be determined at any time during transport. Furthermore it is preferable for the gripping device to be deflected in a plurality of degrees of freedom, for example in an X, Y and Z direction, in particular in order to equalise inaccuracies of positioning. In this case, however, it would also be possible that one or more of these degrees of freedom can be electromechanically blocked out. In this way a faster working operation of the system can be achieved.

Advantageously a detecting device is provided which can detect the position or a deflection with respect to these degrees of freedom, preferably for example by electric interrogation.

In a further advantageous embodiment the gripping device has active gripping elements which produce a positive and form-fit engagement with the blow mould device. In this case it is possible for the gripping device to produce a positively engaged connection between the two side parts of the blow mould device and furthermore preferably a form-fit connection between the said blow mould halves and the base mould. This second connection to the base mould can be achieved by means of corresponding engaging elements of the side parts and/or the base mould.

In a further advantageous embodiment the system, in particular the gripping device, has centring elements in order to enable exact positioning of the gripping device on the blow mould device or on the transforming station. These centring elements can have lead-in chamfers, for example conical lead-in chamfers, by which during the changing operation the gripping device engages in corresponding elements on the transforming station or contacts these corresponding elements. These corresponding elements are advantageously disposed on a mould support. In this way the gripping device can be positioned relative to the blow mould device to be transported.

Furthermore the present invention is directed to a method for operating a transforming device for transforming plastic parisons into plastic containers. In this case in a working operation of the system the plastic parisons are transported by means of a plurality of transforming stations along a predetermined transport path and are expanded by application of a flowable and in particular a gaseous medium to form the plastic containers. Furthermore for expanding the plastic parisons blow mould devices are used, in the interior of which the plastic parisons are expanded to form the plastic containers. Furthermore in a changing mode at least one of the blow mould devices of the system is removed and/or one of the blow mould devices is disposed on a blow mould support of the system.

According to the invention, for changing the blow mould devices a preferably automatically operating changing device is used which has a gripping device for gripping the blow mould device, wherein this gripping device is movable in at least two different directions. Preferably the gripping device can swivel with respect to at least three swivel axes, preferably with respect to at least four swivel axes.

A changing device of the type described above is preferably used.

This changing device preferably has at least one changing arm which can swivel and is disposed at least indirectly on the base support. It is therefore proposed to dispose a changing device, in particular in the form of a changing robot, directly in the region of the system for transforming. Therefore this system advantageously has a base support, such as for instance a machine frame, on which the station support is also disposed. The changing robot is also in turn disposed on this base support, so that it can be integrated as a whole into the machine.

A substantially indirect arrangement is understood to mean that the changing device can be disposed directly on the base support, but it is also conceivable that the changing device is disposed on a further element, for instance an intermediate support, which in turn is disposed on the base support.

Thus an integration of the changing device or of the robot into the machine is proposed. The blow mould device is advantageously of multi-part construction and has at least two side parts and a base part. In operation these three parts form the said hollow space for expanding the plastic parisons. Advantageously at least two parts and particularly preferably all three parts of this blow mould device can be locked with one another, so that the blow mould in its entirety can be removed from the machine or from the blow mould support. Thus the blow mould support is suitable to receive different blow mould devices. In this case it would be possible that the blow mould device itself is also disposed by means of support shells on the blow mould support.

Advantageously the blow mould supports can be moved and in particular can swivel with respect to one another. In this case in a working operation the blow mould supports can be swiveled apart by a predetermined swivel angle, in order to introduce plastic parisons and/or in order to remove finished containers. In this case larger aperture angles are preferably possible for the changing mode.

In a further advantageous embodiment the transforming stations each have stretching rods which can be introduced into the plastic parisons in operation in order to expand them in the longitudinal direction. Advantageously the individual transforming devices also have application devices which in particular have blow moulding nozzle which in operation supply the plastic parisons with a free-flowing and in particular a gaseous medium. In this case it would be possible that also other parts of the transforming stations are replaced, such as in particular the said application device or blow moulding dies and/or the stretching rods.

Advantageously the station support is a rotatable support, such as in particular a blow wheel. The individual transforming stations are preferably disposed on an external circumference of this rotatable support. Thus in the working operation the transforming stations are moved along a circular path.

Advantageously the system has a driving device for moving the station support and in this case the driving device preferably enables both a continuous movement of the station support and also a cyclical movement of the station support, which thus has rest phases in each case between movements. Advantageously this type of movement is adjustable as a function of a mode of operation. In a working operation the station support is preferably moved continuously and preferably cyclically in a changing mode. In this case a movement of this station support can also be co-ordinated with movements of the changing devices. The station support is advantageously a blow wheel.

The procedure according to the invention makes possible a fully automatic changing operation, in particular by means of an industrial robot. Advantageously, in particular in a changing mode, the blow mould device can be locked fully automatically, or the individual elements of the blow mould devices can be fastened to one another. Thus the changing device is preferably suitable for gripping or removing the complete blow mould device, that is to say the at least three components thereof together. Advantageously after the gripping of the blow mould device a corresponding mould lock can be deactivated. In a further stage the changing device can place the mould unit in a storage device, such as a magazine.

Consequently the changing device can insert a new mould unit or a new blow mould device into a blow mould support and (preferably) lock the new blow mould device with the blow mould support.

Then the station support can be moved along by a position in order to replace a further blow mould device. Thus in particular a fully automatic operation can be carried out in which no user is necessary.

In a further advantageous embodiment the device has a housing which at least surrounds the station support in the circumferential direction thereof. In this case in principle the complete blow mould device and/or the changing device can be disposed within a housing, wherein this housing can also have a protective function.

The changing device is preferably integrated directly into the machine and can for example be attached to a base mount. In a further advantageous embodiment the changing device as a whole can be moved in a space surrounded by the housing. In this situation it is possible in an operational state for the changing device to be completely integrated into the machine and so for example is not even visible from the exterior and in particular does not disrupt the operation of the transforming device. In this case it is possible for a casing of the housing also serves as a protective device for the changing device or the robot. Thus in the working operation the said changing device is disposed inside the housing.

In a further advantageous embodiment the changing device has a first control device for controlling a removal movement of the blow mould devices and/or a feeding or arranging movement for arrangement of the blow mould devices on the blow mould supports and the system preferably also has a second control device for controlling a blow moulding operation, wherein the first control device and the second control device co-operate at least partially and/or at least intermittently. In particular these two control devices co-operate during a blow mould changing operation. Thus during a changing operation the same movements which are also necessary in the working operation can also be used for the changing operation, such as for example the transport movement of the transforming stations, the opening and closing of the blow mould support and the like.

In the changing operation the blow mould supports can likewise be opened in order to be able to remove the blow mould device. Thus for example the second control device can effect opening of the blow mould support and as a function of this the first control device can effect a removal of the blow mould devices. Also in this way a fully automatic change of the blow moulds is possible. Thus the controller of the changing device preferably interacts with the control device of the transforming machine or blow moulding machine.

In a further preferred embodiment the changing device has a first control device for controlling a removal movement of the blow mould devices and/or the arranging movement for arrangement of the blow mould device on the blow mould supports and the system also has a second control device for controlling a blow moulding operation, wherein one control device is integrated into the other control device.

In particular the control of the changing device is integrated into a control of the system or blow moulding machine. Thus it would be possible that the changing device is designed as a module which can also be integrated into the blow moulding machine by control engineering, for example after fitting together or connecting by control engineering. Thus it would also be possible for a changing device to be retrofitted to already existing systems. These control devices can be configured in such a way that a protection region is extended during a changing operation. In a working operation the changing device can be located in a rest position in which it does not pose any danger, and in which it also does not hinder operation of the machine.

In the changing operation the changing device is also active, so that those regions in respect of which entry could be dangerous for the user in some circumstances dangerous, must be extended. Thus it is conceivable that protection regions modified in the context of the changing operation are also shut off for the user or at least made discernible.

In this case it would be possible in the context of the changing operation for additional protective elements to be actuated, so that the safety of the operator can be increased.

In a further advantageous embodiment the changing device has at least one gripping device for gripping the blow mould devices. This may be a gripping device which grips the blow mould device in its entirety. In this case it would be possible for media required on the gripping device and/or electrical signals to be guided through regions of the changing devices, such as for example axles or swivel arms. It would also be possible for such connections to be guided via rotary feedthroughs, for example on the axes of the changing devices.

In a further advantageous embodiment the changing device has at least one detecting device for detecting at least one force acting on an element of the changing device. In particular external forces, which for example act on a changing arm which removes the blow mould devices, can act in this way. Thus in particular the above-mentioned control device can be designed in such a way that it can react to external forces, for example during defined operations such as setting down or picking up a blow mould device, it can deflect the changing device from a desired position (Softfloat). This generally involves a detecting device which can react to physical actions or can detect such actions, such as for instance a torque, forces, impulses or the like. In this way a fast reaction of the changing device is possible.

However, the changing device preferably moves within a limited working range. This means that in particular the removal and delivery movement for the blow mould devices takes place in a limited working range. In reaction to the above-mentioned external forces a position can deviate from this working range. Otherwise, however, this defined working range is preferably maintained, in particular during a mould change.

In this case it is advantageously possible that the working range of the changing device is limited from the point of view of safety and in particular mechanically. Such a delimitation would be possible by different measures, for instance by light barriers, which detect an incorrect or excessive movement of the changing device and consequently effect either a return or an emergency stop of the changing device.

In addition, however, a delimitation of the working range by mechanical elements, such as for example stops, would also be possible.

In addition it is also preferably possible for a working range of the changing device to be checked from the point of view of safety and electrically or also from the control point of view. In this case it is in particular possible that this working range is (further) restricted, deviating from a maximum possible working range.

In a further advantageous embodiment the changing device has a serial and/or parallel kinematics with at least three movement axes. In a further advantageous embodiment the changing device has a serial and/or parallel kinematics with at least three movement axes.

In this way a very high freedom of movement of the changing device or of a gripping element of the changing device is made possible. The blow mould devices can therefore also be removed from their blow mould supports or delivered thereto in a different manner depending upon the actual situation.

In this case it is possible for the system to have an operating device in order to control the changing device or the gripping arm. This device may for example be a manual operating device. However it would also be possible for the changing device to be controlled by means of devices such as for example smartphones.

In this case control by such an operating device is advantageous in particular in the setup mode, that is to say when delivering new blow mould devices.

Furthermore the present invention is directed to a method for operating a transforming device for transforming plastic parisons into plastic containers. In this case in a working operation of the system the plastic parisons are transported by means of a plurality of transforming stations along a predetermined transport path and are expanded by application of a flowable and in particular a gaseous medium to form the plastic containers. Furthermore for expanding the plastic parisons blow mould devices are used, in the interior of which the plastic parisons are expanded to form the plastic containers. In this case in a changing mode at least one of the blow mould devices of the system is removed and/or one of the blow mould devices is disposed on a blow mould support of the system.

According to the invention a changing device disposed on the system is used for changing the blow mould devices. Therefore it is also proposed in terms of the method that such changes of blow mould are carried out by means of a changing robot disposed on the system or integrated therein.

In a further preferred method, in the working operation the transforming stations are transported along a circumferential transport path, and in the changing operation, in a predetermined defined position of the respective transforming station from which the blow mould device is to be removed, the blow mould devices are removed with respect to the circumferential transport path. It is therefore proposed that in the working operation the transforming stations revolve, as is known in the prior art. For the individual changing operation, however, it is proposed that this takes place on at least one precisely defined station which in particular is also located in a sphere of action of the changing device. In other words the removal position on a blow wheel is advantageously always identical. In this case it is possible, during the production or the working operation, for the changing device to be oriented in such a way that it can be disposed inside a blow moulding machine protection region or housing.

With regard to the control device it is conceivable that by means of two independent co-ordinate systems this control device controls the sequence of movements of the changing device or of the robot. In this case a co-ordinate system is preferably placed at the removal or entry position of the blow mould device to the transforming station or the blow mould supports. A further co-ordinate system can be located in the region of a receiving device or a magazine in which the blow mould devices are set down.

However, it is possible for the positions of the receiving points of the blow mould devices on the receiving device or the magazine relative to the co-ordinate system thereof to remain unchanged independently of the receiving device and/or for the positions of the receiving points to be located equidistantly with respect to this co-ordinate system. In this case it is possible to provide a display device, such as in particular an input screen of the changing device. By means of this device specific values of the co-ordinate systems, in particular the X, Y and Z values of the co-ordinate systems, can be changed. In addition a further input device, such as an input screen, which preferably interacts with an input device of the blow moulding machine, can preferably be disposed on the changing device.

Several possibilities are conceivable for removal and delivery of the blow mould devices.

Thus it would be conceivable that at the outset all blow mould devices are removed from the individual mould supports, that is to say the individual transforming stations, and fed into an empty magazine or storage system. Then this storage system with the old moulds is replaced by a full storage system with new blow mould devices to be inserted. Then all new moulds are inserted into the blow mould supports. The change of the storage systems can take place for example by means of lift trucks or by means of turntables, for instance in the manner of a pallet change in the case of machine tools. In this case for a complete change the blow mould support will advantageously carry out two complete revolutions.

In a further possible changing operation a magazine contains an empty space. In this case first of all a new mould from a mould location is placed in this empty space. Then an old mould from the mould support is placed into the said mould location. In a further step a new mould is transferred from the magazine into the mould support. Then a second new mould is placed in the empty space and so on, until the entire switch is completed. The interim storage in an empty space ensures that a specific blow mould device is again transferred at a specific storage location or a specific blow mould support. In this case advantageously the said empty space is located spatially between the blow mould support and the storage system and preferably on or in the storage system itself.

The removal of the blow mould device and/or the delivery of new blow mould devices advantageously takes place in a cycle control mode. This means that the individual change of the blow mould device takes place while the transforming station is static. In this case the changing device may set down a specific blow mould device in a magazine, and during this the transforming device itself can move further by one station, that is to say the blow wheel rotates by one position. A radial direction relative to the transport path is advantageously used for insertion and removal of the blow mould device. As mentioned above, it is also possible to park or to set down the blow mould device in an intermediate station. For this purpose a vertical movement can preferably be used.

In terms of the method it is possible for the gripping device of the changing device to grip the blow mould device in positive engagement in order to transport it or to remove it from the system. The gripping device of the changing device advantageously engages form-fit in the blow mould device.

In a further advantageous embodiment the removal and/or the setting down of the blow mould device takes place under path and/or force control and preferably under both path and force control.

In the context of control it is possible for the changing device to approach at least one defined reference point on the transforming station or the receptacle or blow mould supports and/or preferably also at least one defined reference point on a storage location, such as for example a magazine. In this way the said points can be transferred into the controller of the changing device are being, so that the exact positions of the mould holder or of the blow mould support and also of the magazine or the storage device can be ascertained. In this case it is preferably possible that the said reference points after each change of a magazine device are approached or are also approached even in the event of malfunctions, such as for example power failures, in order thus to be transferred into the controller.

In this case it is possible for the reference points thus ascertained to be stored and/or compared with reference points which are stored in the controller or a storage device of the controller. If a discrepancy exceeding a predetermined value occurs between the ascertained reference point and the already stored reference points, a fault message or a notification can be generated.

In a further advantageous embodiment the changing device has an image recording device, such as for instance a camera or the like. With the aid of this camera device it is possible to detect the precise pickup and set-down points for the blow mould devices.

In this connection it is conceivable that the blow mould devices and/or the blow mould support and/or the magazine device each contain an identification in order to ensure co-ordination between the blow mould devices and the respective blow station. In this way it can be ensured that a specific blow mould device which has been removed from a specific transforming station is also associated again with the same transforming station during a further change. Thus it would be possible that an individual identifier is associated with each holding magazine.

These identifications may for example be bar codes, QR codes, RFID tags and the like. Advantageously it is possible for this identification to be retrieved contactlessly. Advantageously the identification or a characteristic value for this identification is taken up into the control device of the machine.

In a further method it is also conceivable that the respective identifications are read in again after each change of the magazine device or also in the event of failures of the machine. In this way a secure co-ordination is ensured even under exceptional conditions.

A receiving device or a magazine for the blow mould devices is described below. For a mould change this receiving device can be disposed at a suitable position, for instance beside the transforming equipment. In this case the magazine or receiving device can have insertion regions by means of which the blow mould devices can be placed into the magazine or the receiving device. These insertion regions may be of conical construction in order to facilitate secure insertion of the blow mould device. Advantageously in this case the blow mould device or the mould set is introduced substantially vertically into the magazine. Particularly preferably the blow mould device can be placed into cylindrical openings in the magazine or the receiving device. The magazine itself can be disposed—in particular by positive engagement—in this receiving device.

In a preferred embodiment this magazine device may have elastic elements, in particular in the region of the cylindrical openings, for introduction of the blow mould devices in order to be able to compensate for tolerances.

In a further advantageous embodiment it would also be possible that, in the regions in which the blow mould device comes into contact with the cylindrical openings of the magazine device, the magazine or the receiving device and/or the blow mould device is equipped with insertion regions and in particular with tapered insertion regions.

In a further advantageous embodiment, as mentioned above, the magazine or receiving device has a plurality of openings to receive the individual blow mould devices. These openings are advantageously of cylindrical construction. Particularly preferably these openings in the magazine devices are made out of plastic at least in some areas.

In this case it is possible for these openings to be disposed in a plurality of rows and for example for two adjacent rows to be offset with respect to one another. In this way the packing density of the blow mould devices can be increased.

In a further advantageous embodiment the position of the blow mould device inside the receiving device is lower than the position of the blow mould device in the blow mould support. In this way the latter is lowered during the dismantling of the blow mould device.

In a further advantageous embodiment the magazine has a polygonal and preferably rectangular external contour, wherein the long side of this external contour is preferably disposed substantially perpendicular to an imaginary radial connecting line between a centre point of the pitch circle and the blow mould supports. In this way the magazine device can be very easily reached by the changing device or an arm of the changing device.

The configuration of the blow mould device is described below. Thus it is conceivable that, for unlocking the blow mould devices on a mould support or also a mould support shell or also during unlocking of a base part of the blow mould device, the arrangement, that is to say in particular the side part and the base part, are mechanically connected to one another. However, a magnetic connection might also be considered.

Advantageously such a fixing mechanism which connects the individual blow mould parts to one another, is constructed so that this only exhibits or carries out a force in a tensile direction and has a specific resilience radially radially with respect thereto, in order to compensate for tolerances. A projection, a cam or the like, which can be engaged by an element of the gripping device or into which the gripping device can move, can advantageously be provided on the parts of the blow mould device, such as for instance the blow mould halves.

In a further advantageous embodiment the projections or cams joined to a gripping device are advantageously disposed radially within the pitch circle described by a centre point of a container. In this way it can be ensured that also in the working operation these cams cannot come into contact with brackets, for example an intake and discharge starwheel.

In a further advantageous embodiment it would also be possible that between the two mould shells and a base mould of the blow mould device there is a positively engaged connection which prevents a rotation of the base mould relative to the side parts or mould shells. In addition it would also be possible that before the changing operation the base mould is mechanically connected to the mould halves.

In order to simplify a loading and unloading operation it would be possible that during the loading and unloading (of the plastic containers) an axis of rotation of the blow mould device extends substantially parallel to the axis of the mould support or also to an axis of rotation of the blow wheel.

In a further advantageous embodiment it would also be possible that a protection region of the blow moulding machine is automatically separated during production from a storage region of the blow moulds or blow mould devices. In this case such a separation can be carried out—in particular automatically—at the start of a mould change operation.

Thus the protection regions can be modified so that during the production of the system or during the working operation a machine operator can enter a region of the mould store. Thus it would be conceivable that for example an electromechanical unit ensures the position of a transforming station relative to the changing device in each case after the positioning of the blow wheel, preferably by positive and/or form-fit engagement.

Furthermore it would also be conceivable that the robot places the blow mould device or the mould set from an intermediate position into the magazine, whereas the blow wheel moves onwards by a cycle or brings a subsequent transforming station into a changing position. In addition the sequence of a blow mould device change could generally include approaching an intermediate station on which the blow mould device is temporarily parked or set down. In this case needs the holding device does not have to be configured as a double gripper and nevertheless a co-ordination of the moulds in a storage device such as a magazine is possible in a manner adapted to the station.

As already mentioned above, it may be advantageous if the opening movements of the blow mould support and of the base in a changing position for the blow mould device differ from those in operation. This may be advantageous for example in the case of a mould support control which is not coupled. It would also be possible that a blow mould support of the neighbouring station which is respectively leading or trailing relative to the one in the blow mould device changing position is likewise swiveled away in some regions in order to facilitate a greater opening angle for the transforming station located in the changing position.

Furthermore it would be possible that a fixing mechanism for the mould shells and the base moulds has progressive characteristic curve during a clamping sequence. At the start of such a clamping sequence a large stroke with a low force can take place in order to be able to bridge the greatest possible distances during drawing in. Towards the end of the clamping sequence a high force is preferably implemented with only a small stroke.

In a further advantageous method the changing position of the blow station and/or the magazine and/or any intermediate position in which the blow mould device is temporarily positioned is located in a predetermined circumferential range of an effective radius of the changing device, preferably in a range of 270° of the effective radius, preferably in a range of 220° of the effective radius and particularly preferably in a range of 180° of the effective radius.

In a further advantageous method, when the blow mould device is removed from the stations and/or arranged on the blow mould support the changing device or the changing robot carries out a radial movement relative to the pitch circle of the system. This may be a purely radial movement, but it would also be conceivable for it to be a movement with a radial component.

In a further advantageous method, when the blow mould device is removed from the stations and/or arranged on the blow mould support the changing device or the changing robot carries out a substantially vertical movement. "Substantially" is understood to mean that the direction of movement deviates from the exact vertical direction by no more than 20°, preferably by no more than 10° and particularly preferably by no more than 5°.

BRIEF DESCRIPTION OF THE DRAWINGS

Further advantages and embodiments are apparent from the appended drawings.

In the drawings:

FIG. 1 shows a schematic representation of a system according to the invention;

FIG. 2 shows a representation of the system with illustrated changing device;

DETAILED DESCRIPTION OF THE INVENTION

Figure 3:
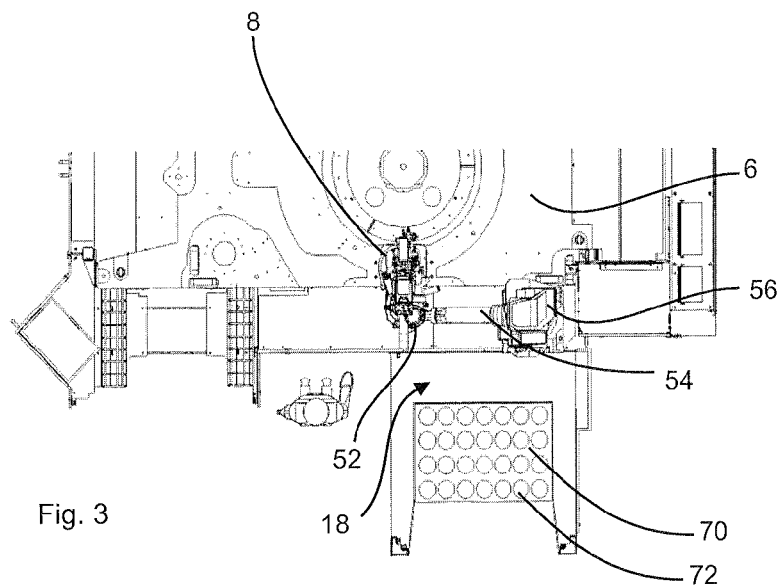
FIG. 3 shows a plan view of the system shown in FIG. 2.

FIG. 1 shows a schematic representation of a system 1 for transforming plastic parisons into plastic containers. In this case the plastic parisons 10 are delivered to the individual transforming stations 8 and expanded to form plastic containers 20. After this expansion the plastic containers are removed again from the system. For this purpose a delivery starwheel can be provided which delivers the plastic parisons to the system 1 and also onto a discharge device, in particular likewise a transport starwheel, which discharges the finished containers from the system. The system 1 has a station support 12 on which a plurality of transforming stations 8 are disposed. This station support may be for example, as shown in FIG. 1, a blow wheel which is rotatable with respect to an axis of rotation D (which here extends perpendicular to the drawing plane and thus vertically). Each individual transforming station has a respective blow mould device 14. This blow mould device 14 is composed of two side parts and a base part. These blow mould devices can be replaced according to the invention. In this case the blow mould devices 14 are disposed on blow mould supports 16 arranged and can be removed therefrom or disposed thereon.

The reference sign 40 identifies a changing device which serves to remove the blow mould devices from their blow mould supports or to dispose the blow mould devices on the blow mould supports. The reference sign 6 identifies a base support on which the station support 12 is rotatably mounted. The changing device 40 is also disposed on or adjacent to the base support 6. Thus the changing device 40 can be integrated in the system. The reference sign 18 identifies a housing, which at least partially surrounds the station support 12, but which preferably, as shown below, can also enclose or surround the changeover device 40.

The reference sign W designates a changing position. As mentioned above, the blow mould devices are preferably replaced at a specific changing position. This means that the transforming stations can be moved successively into this changing position W by a rotation of the support 12 and then at this changing position the old blow mould devices can be removed and preferably also new blow mould devices can be delivered. The reference sign R designates a radial direction. In this radial direction the changing device or a gripping device of the changing device is preferably delivered to the transforming stations or the blow mould devices in order to change them.

FIG. 2 shows a perspective representation of a system 1, which merely shows a transforming device or transforming station 8. The station support on which this is disposed is likewise not illustrated here. Furthermore the base support 6 can be seen, on which the changing device 40 is disposed. This changing device 40 has a first swiveling arm 56 as well as a second swiveling arm 54. By means of an articulation and driving connection these two arms can be connected to one another so as to swivel.

The reference sign 52 designates a gripping device which serves in order to grip and to transport the blow mould devices. This gripping device is in turn disposed so as to swivel on the second arm 54 and is preferably also rotatable. Thus overall the gripping device can swivel about at least three, preferably about at least four axes in space. In addition it would also be possible, as illustrated by the rectangle shown by a broken line, that a plurality of changing devices are provided, wherein these are in particular disposed in each case at least indirectly on the base support 6. In this way the individual blow mould devices could be replaced more quickly in a changing operation.

The reference sign 46 identifies schematically a detecting device which detects forces acting on the changing device 40 or the gripping device 52 in order thus to switch off in an emergency. The system advantageously has a plurality of such detecting devices, wherein preferably each one is associated with an individual driving device which effects a movement of the changing device 40 or of the gripping device 52.

These detecting devices may for example be force measuring devices which actually determine forces, torques and the like. However, it would also be possible that the forces are determined from parameters of the respective drive, for instance from flows or the like.

The reference sign B identifies a user who operates the system. Advantageously during operation of the changing device the user cannot move in regions which conversely can be reached by the changing device 40.

The reference sign 22 identifies a control device for controlling the changing device. The reference sign 42 identifies a control device for controlling the transforming device. In this case these two control devices can interact with one another, in particular for a changing operation for replacement of the blow mould devices. In this case it is possible in a normal working operation of the system for the changing device 40 to move into a rest position in which the changing device occupies the least possible space.

FIG. 3 shows a plan view of the system shown in FIG. 2. It will be recognised here that the changing device 40 is likewise integrated into the housing 18. In the state shown in FIG. 3 the arm 56 is just swiveled out, so that the gripping device 52 can just grip a blow mould device.

In addition a magazine device 70 is also illustrated which has a plurality of receiving points 72 for receiving the blow mould devices. In this case these blow mould devices can each be moved into the receiving points or holes 72.

Figure 4:
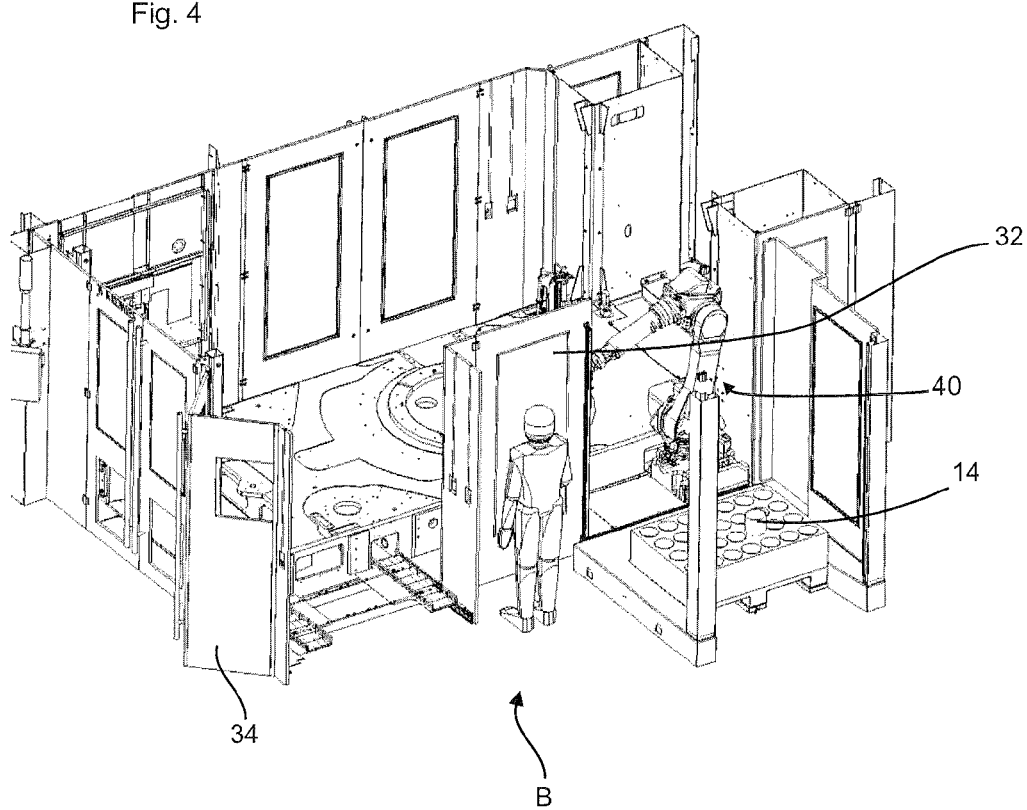
FIG. 4 shows a further representation of the system shown in FIG. 2.

FIG. 4 shows a further representation of the system according to the invention. It will be seen that here a wall 32 is provided which separates the user B from the changing device 40, so that the user cannot be injured. In addition further movable wall parts 34 can also be provided, so that on the one hand the machine is more easily accessible for maintenance purposes, or on the other hand further changing devices can also be provided, as also illustrated in FIG. 1.

Figure 5:
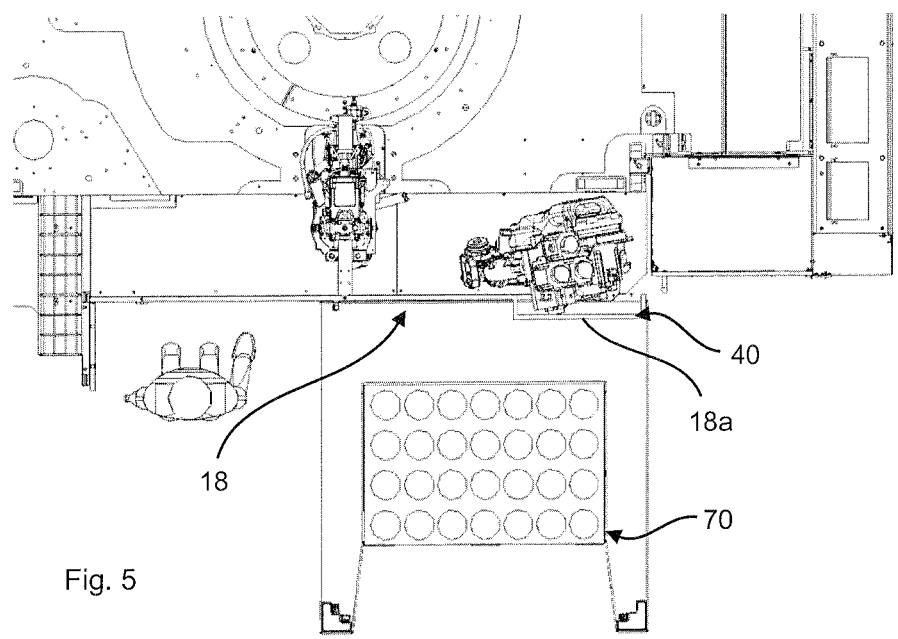
FIG. 5 shows a further representation of the system shown in FIG. 2 in a further operating position.

The representation shown in FIG. 5 is similar to the representation shown in FIG. 3, but here the changing device 40 is in a different operating position. This may for example be a working operation in which the system transforms plastic parisons to form plastic containers. It will be recognised that a recess 18a which also serves to completely receive the changing device 40 can be disposed in the housing 18. In the state shown in FIG. 5 the individual arms of the changing device 40 can be hinged inwards so that the changing device 40 occupies only a small space.

Figure 6:
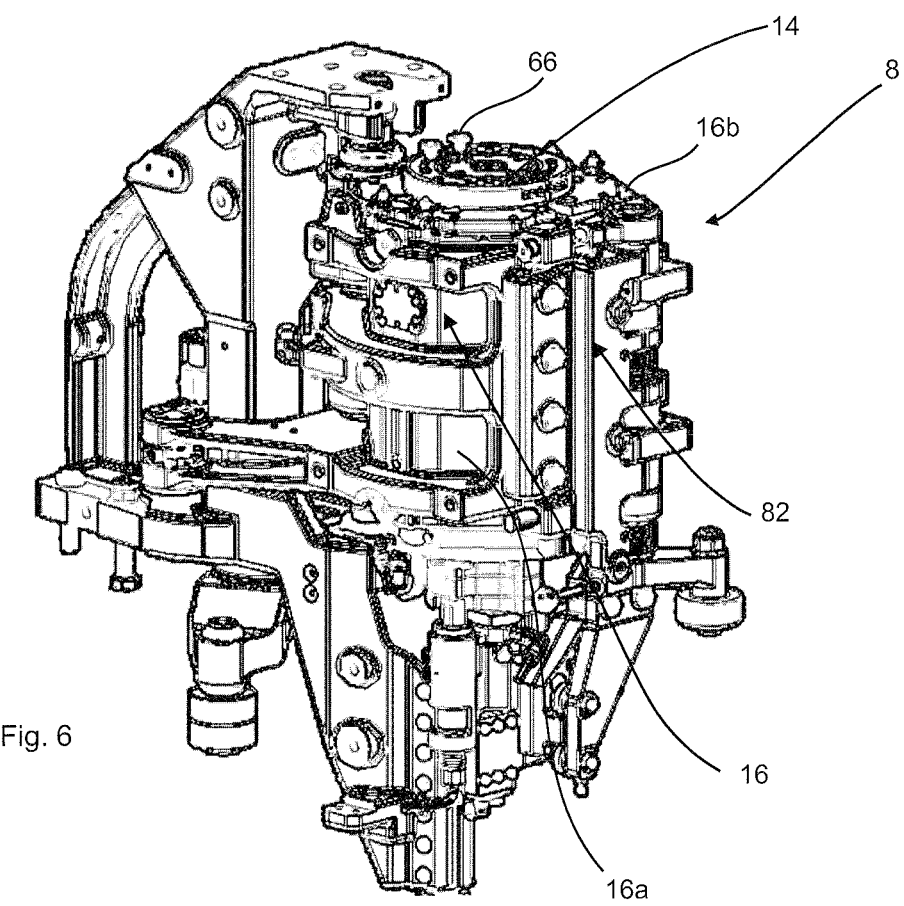
FIG. 6 shows a representation of a transforming station.

FIG. 6 shows a representation of a transforming station 8. The blow mould support 16 can be seen here which can have two blow mould support parts 16a, 16b which can swiveled apart in order to open and to close the blow mould device 14. Also for the changing operation the two blow mould support parts 16a, 16b can be swiveled apart, in order to be able to remove the blow mould device 14.

The reference sign 82 designates as a whole a locking device which in the working operation locks the two blow mould support parts 16a and 16b to one another, so that even with greater pressures they do not swivel apart. The reference numeral 66 relates to a projection which in each case is disposed on the two side parts of the blow mould device 14. This projection is designed to be so stable that the entire blow mould device 14 can be supported on this projection. In this case the gripping device or a component of the gripping device can engage behind this projection 66, so that the gripping device 52 can support the blow mould device by means of this projection. By means of holding of the respective side parts of the blow mould device on the projections 66 the blow mould device in its entirety can also be held together.

Figure 7:
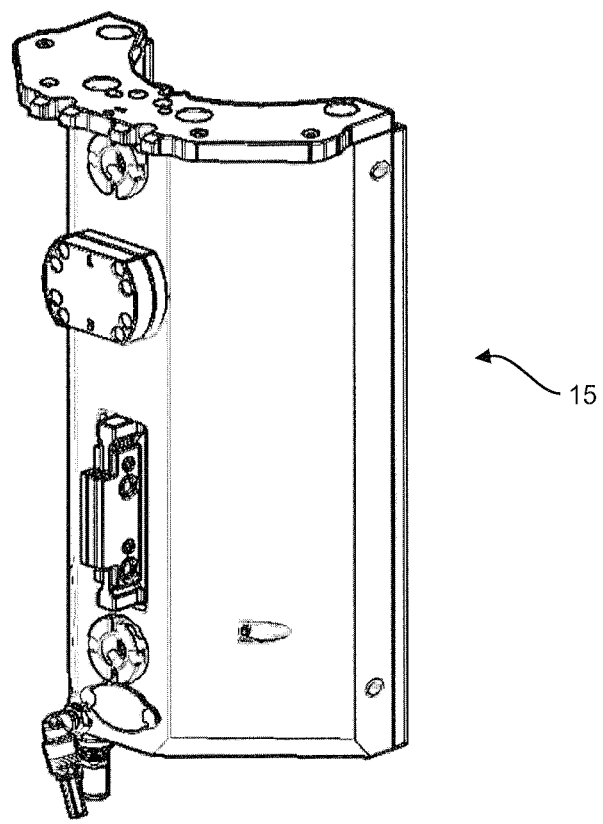
FIG. 7 shows a representation of a mould shell for a blow mould device.

FIG. 7 designates a blow mould support shell. This blow mould support shell 15 can be disposed on the blow mould support 16 and in turn can itself receive the blow mould device or parts of the blow mould device. In this case delivery and discharge elements 15a can be provided, in order to deliver media, such as for example temperature control media, to the blow mould shell 15.

Figure 8:
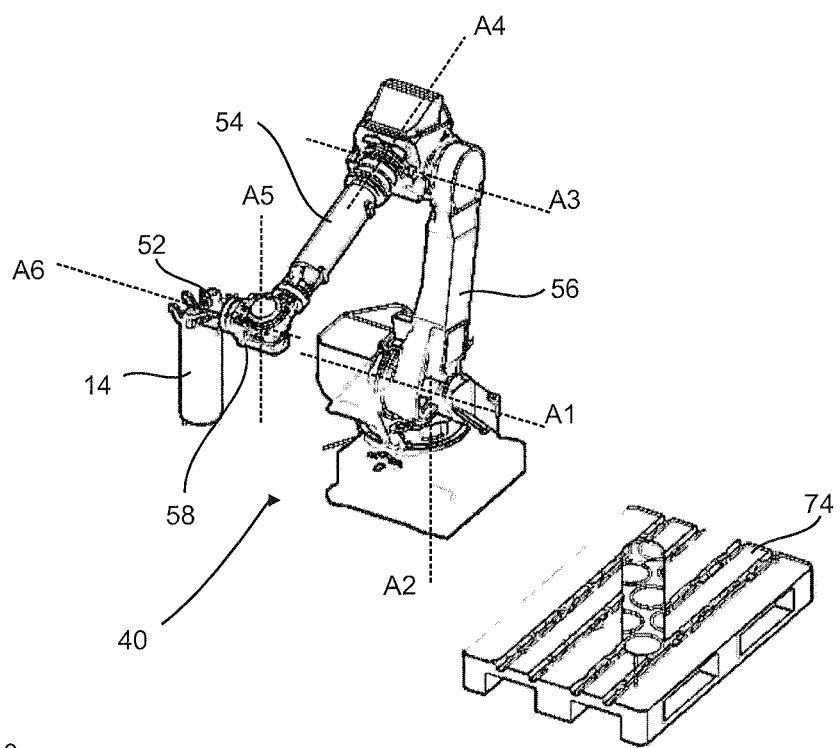
FIG. 8 shows a representation of a changing device.

FIG. 8 shows a further representation of the changing device 40. This shows the first arm 56 which can be swiveled with respect to a first axis A1. In addition, however, this arm 56 is also rotatable with respect to a second axis A2. A second arm 54 is disposed on this first arm 56 and in this case the arm 54 can swivel with respect to an axis A3 relative to the first arm 56. Here the two axes A1 and A3 are parallel to one another. However, these axes can also be disposed obliquely or skew relative to one another. In addition, however, the second arm 54 is also rotatable with respect to a fourth axis A4.

In order to achieve this respective swiveling and rotary movement with respect to the individual axes and also with respect to the further axes to be described, in each case driving devices, such as in particular, but not exclusively, electric motor-powered drive units can be provided. In addition, however, it would also be conceivable to use pneumatic and/or hydraulic drive units. A gripping device 52 which serves for gripping the blow mould device is provided on the second arm 54. In this case this gripping element can swivel with respect to an axis A5 relative to the arm 54. This axis A5 may be perpendicular to the axis A3 and/or also perpendicular to the axis A4. In addition the gripping device is disposed on the arm 54 via a support 58. The gripping device itself can in turn be rotatable relative to this support 58 with respect to an axis A6.

By means of this plurality of movements the blow mould devices 14 can be removed from the individual transforming stations and placed onto a support 74 which is shown here as a Europallet. However it would also be possible to introduce the blow mould devices 14 directly into openings provided in a magazine.

In this case the distance between the magazine device or the pallet 74 and the changing device 40 can be between 1 metre and 2 metres. Also a corresponding radius of action of the changing device may be in the region of 1.5 metre.

Figure 9:
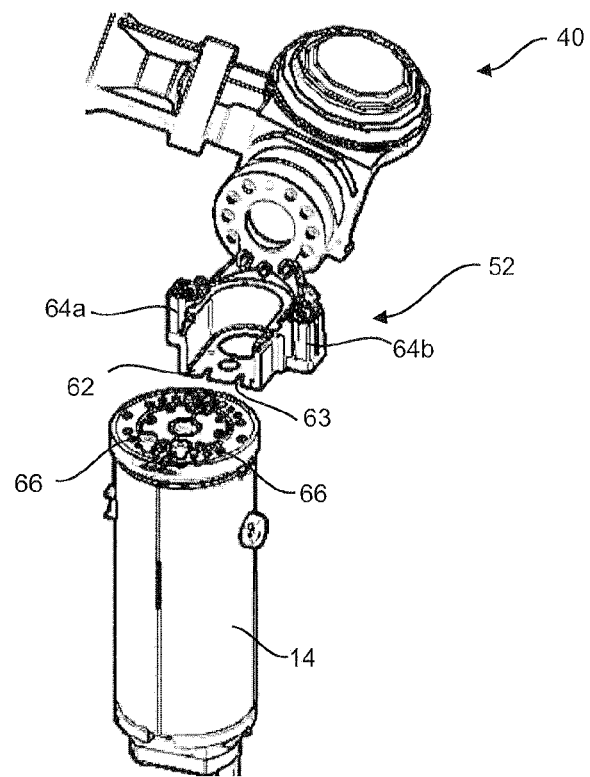
FIG. 9 shows a representation of a gripping device for gripping a blow mould device.

FIG. 9 shows a detail of the changing device 40 or the gripping device 52 thereof. This gripping device may have a guide element 62 which can be guided over a corresponding surface of the blow mould device. In addition projections 64a, 64b can also be provided which serve for centring the changing device 40 or precisely the gripping device relative to the transforming station. The reference sign 63 relates to a recess which is disposed in the guide element 62 and can engage behind the projections for changing the blow mould device. Thus the guide element 62 also serves for supporting the blow mould device 14.

Figure 10:
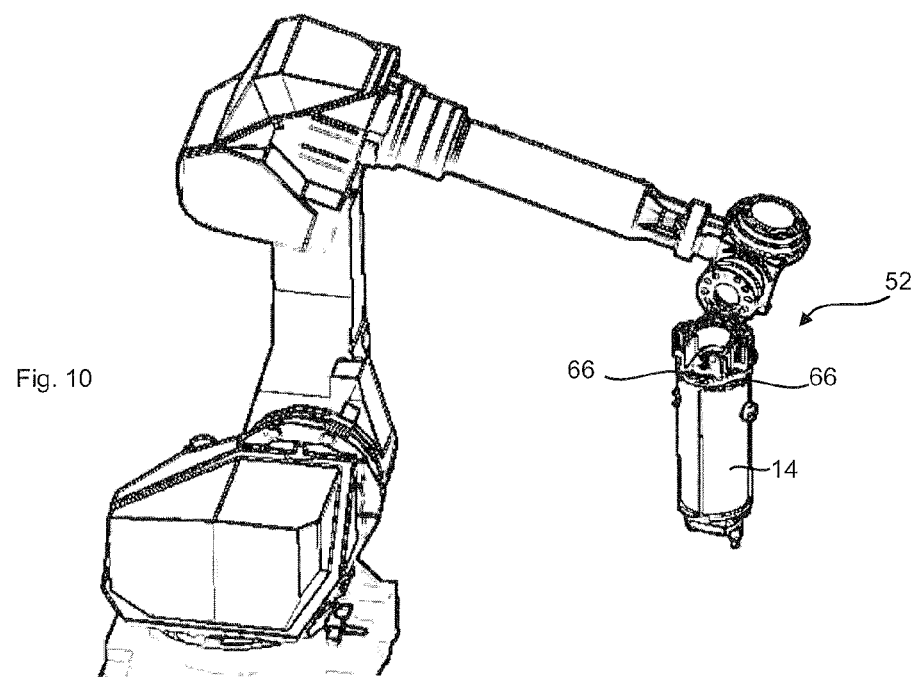
FIG. 10 shows a representation of a changing device with a blow mould device.

FIG. 10 shows a view of the changing device with a blow mould device 14 disposed thereon. It will be seen that the gripping arm 52 here engages in two projections 66 which are disposed on the blow mould device 14 and presses these together, so that in this way the blow mould device is held together. Thus the projections 66 also shown in FIG. 9 and FIG. 6 which are disposed on the blow mould device 14 serve to hold it together during transport. Thus advantageously above the blow mould device 14 the gripping device 52 engages in elements thereof in order to hold it. This type of engagement in the blow mould device is suitable in a special manner since the blow mould device, as is also shown in FIG. 6, projects beyond its support and in this way can also be gripped in a closed state of the blow mould support 16. Thus it is possible for the changing device or the robot initially to grip the blow mould device 14 by means of the projections 66 thereof and only then the blow mould support is opened. In this way it can be ensured that the blow mould device is held securely at any time.

Figure 11:
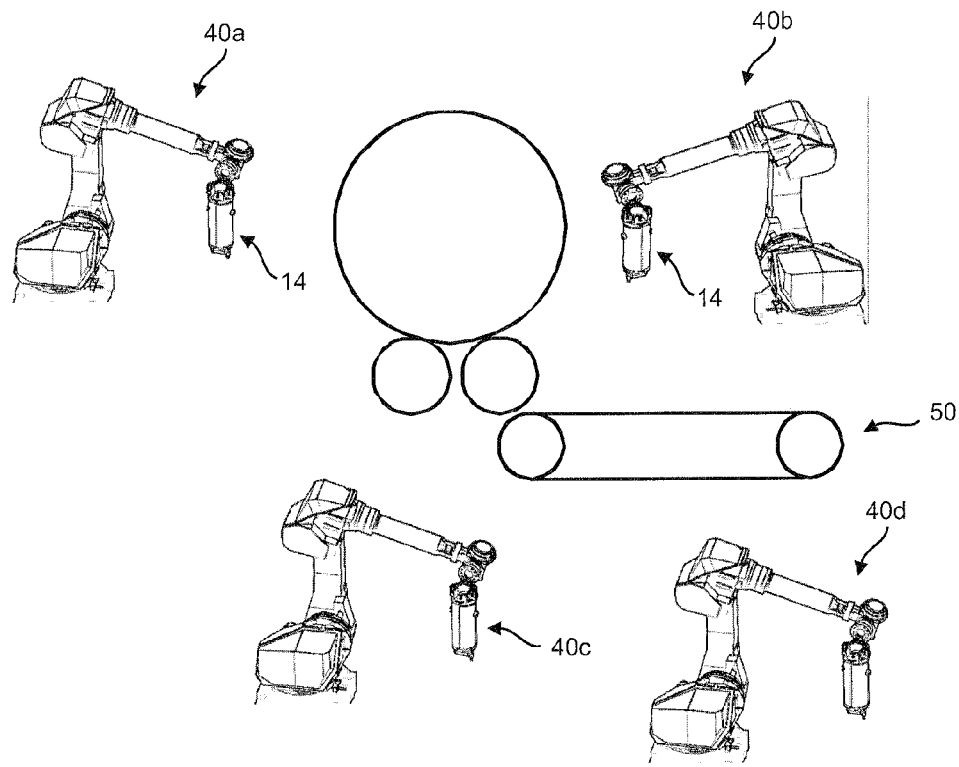
FIG. 11 shows a representation for illustration of possible positions of the changing device.

FIG. 11 shows a further representation of the present invention. Here a plurality of changing devices 40a-40d are provided, by which in each case elements of the system can be changed. In this case it would be possible for example for two of the changing devices (40a, 40b) to be provided, in order to change blow mould devices 14, but also for further changing devices to be provided which replace other elements such as for example heating mandrels which are located in a kiln 50 for heating the plastic parisons (the changing device 40d). In addition, for example holding elements, such as transfer tongs, which transport the plastic parisons after heating to the transforming device 1, can be changed by means of the changing device 40c.

Figure 12:
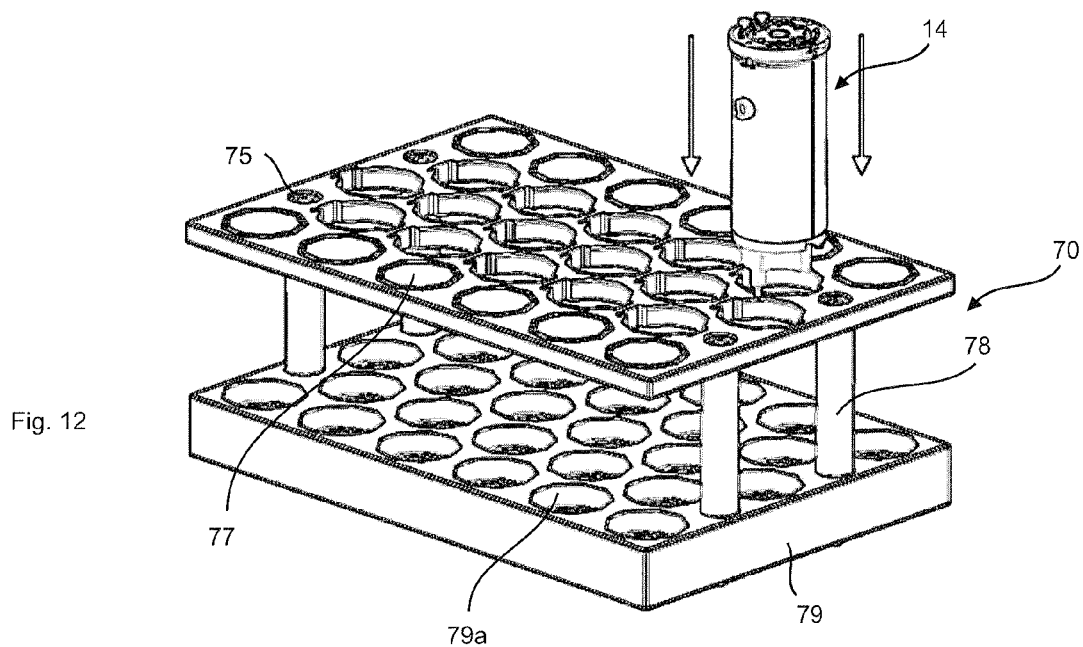
FIG. 12 shows a representation of a magazine with a blow mould device.

FIG. 12 shows a receiving device such as a magazine to receive the blow mould devices 14. This may contain a support plate 75 which has a plurality of openings 77. By means of supports 78 this plate 75 can be arranged on a base support 79, wherein this base support 79 in turn has openings 79a or holes to receive the blow mould devices. Advantageously this magazine has the same dimensions as a so-called Europallet and thus preferably dimensions in a range of 1200×800 mm. In this case the individual openings 79a are, as shown in FIG. 12, disposed in rows and offset from one another, so that the greatest possible number of blow mould devices can be introduced into the pallet.

Figure 13:
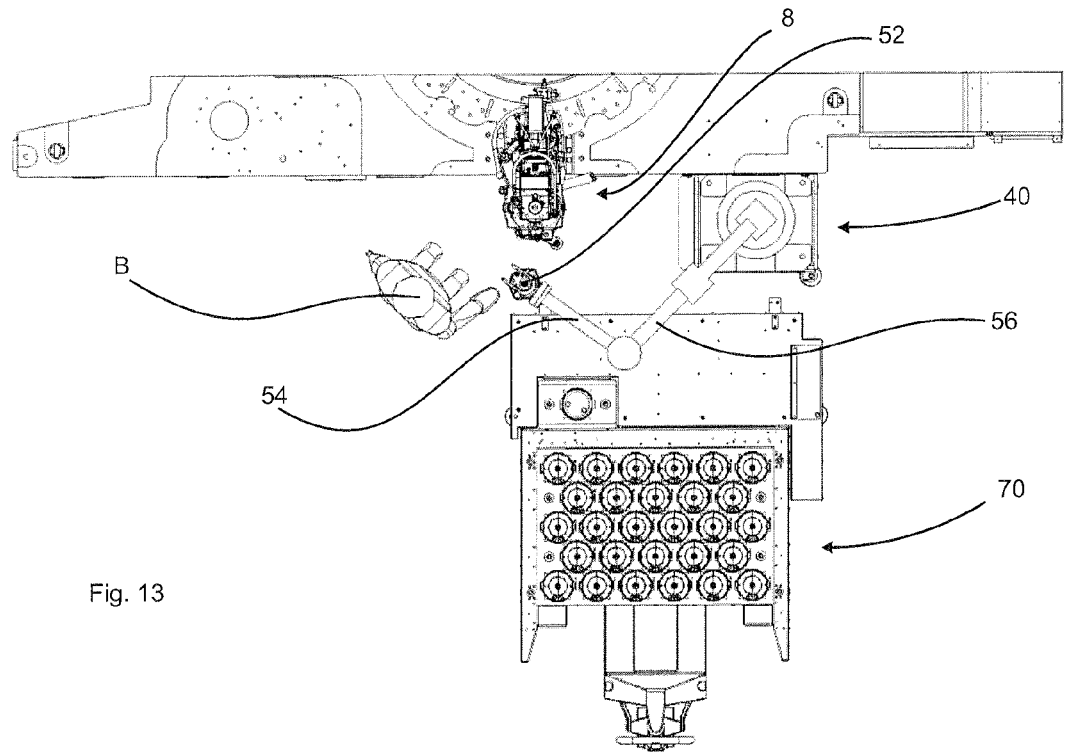
FIG. 13 shows a representation of a further embodiment of the invention.
Figure 14:
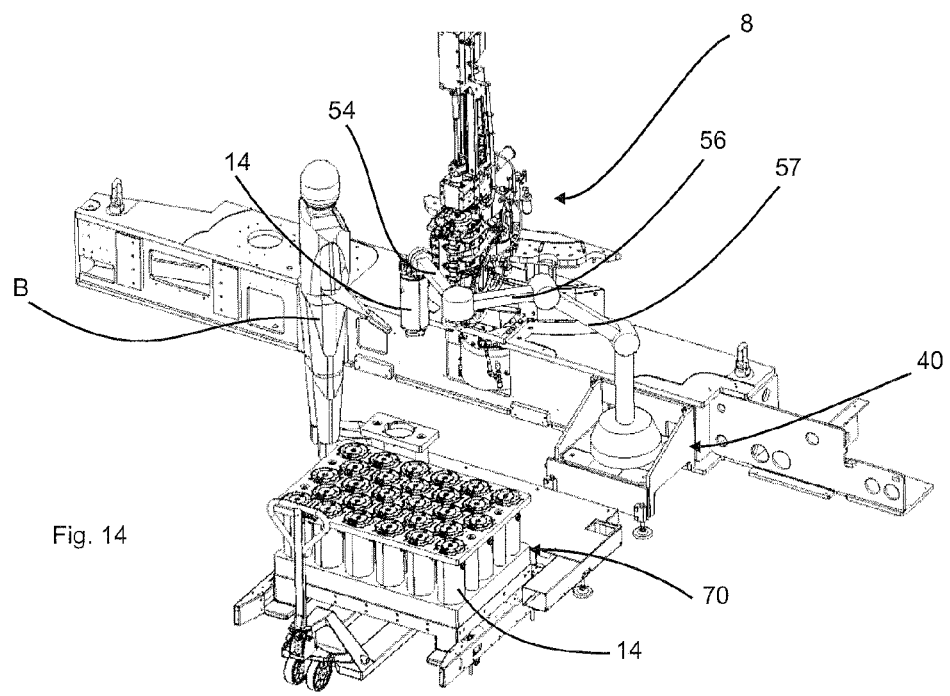
FIG. 14 shows a perspective view of the representation shown in FIG. 13.

FIGS. 13 and 14 show another embodiment of a system of the type set out above. In this embodiment the changing device 40 is configured as a so-called manipulator which can be operated by a user B. Here too this manipulator 40 has a gripping device 52 which serves for holding the blow mould device 14. This gripping device 52 is disposed on an arm 54 and this arm in turn is disposed on an arm 56. The reference sign 57 identifies a further arm on which the arm 65 is disposed.

For changing the blow mould devices the user can bring the gripping device 52 to the transforming device 8 and connect it to the blow mould device. Then the user B can move the blow mould device 14 by means of the changing device 40 to the magazine and store it there.

Figure 15:
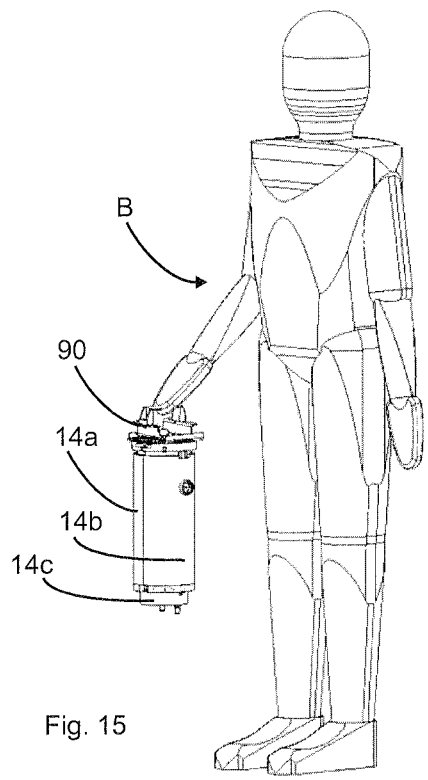
FIG. 15 shows a representation of a user with a blow mould device.

FIG. 15 shows a representation of a user carrying a blow mould device 14. In this case the reference signs 14a, 14b, and 14c designate the individual components of the blow mould device, namely the side parts thereof as well as the base part (14c). The reference sign 90 identifies a holding device which serves for holding the blow mould device. This holding device 90 may be configured in such a way that on the one hand it can be connected to a changing device, but on the other hand however it can also be held by the user B.

Figure 16:
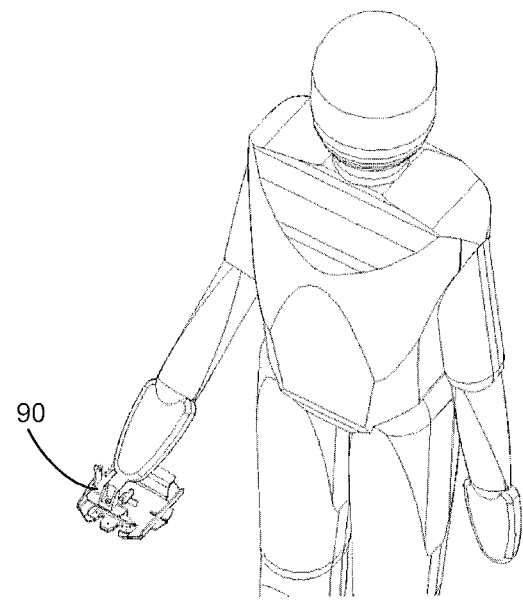
FIG. 16 shows a representation of a user with a holding device.
Figure 17:
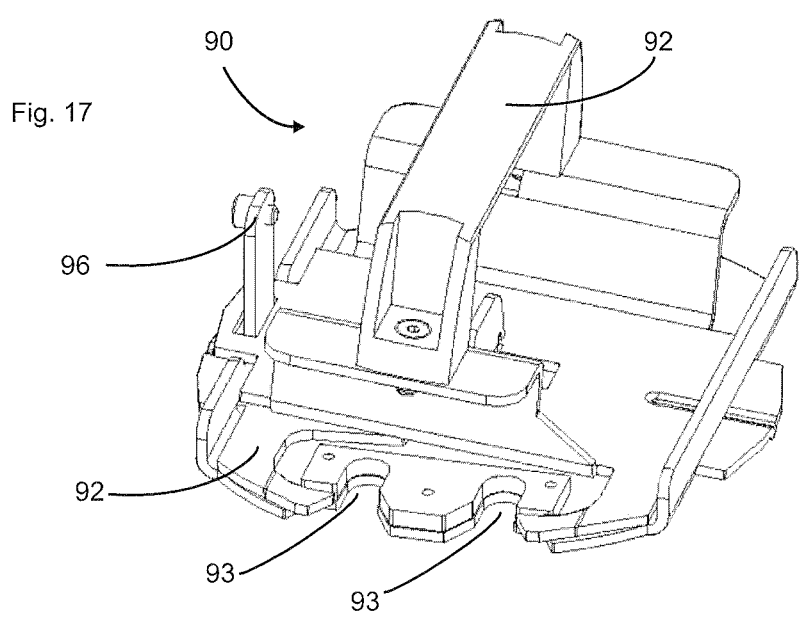
FIG. 17 shows a representation of a holding device.

FIG. 16 shows a user B who is only holding the holding device 90. FIG. 17 shows a detail of a holding device 90. In this case this holding device 90 has a gripping element 98 by means of which it can be gripped by a user B. In addition the holding device 90 again has the two recesses in which in the corresponding projections on the blow mould device can engage. The reference numeral 96 identifies a lever element by means of which an engagement in the blow mould device is produced or released. In this case it is possible for a support plate 92 to be displaced in response to a movement of this lever element in order to free or block the openings 93.

In this way the user can grip the blow mould device 14 by means of the holding device 90, can move it to the magazine 70 and there can release the engagement again after setting down the blow mould device.

The applicant reserves the right to claim all the features disclosed in the application documents as essential to the invention in so far as they are individually or in combination novel over the prior art.

LIST OF REFERENCE SIGNS 1 system/transforming device
6 base support 8 transforming stations
10 plastic parisons
12 station support
14 blow mould device
14a, b, c components of the blow mould device
15 blow mould shell
15a delivery and discharge element for temperature control medium
16 blow mould support
16b blow mould part
18 housing
18a recess
20 plastic containers
22 control device for controlling the changing device
32 wall
34 wall parts
40 changing device
40a-40d changing device
42 control device for controlling the transforming device
46 detecting device
50 kiln
52 gripping device
54 second swiveling arm
56 first swiveling arm
57 third swiveling arm
58 support
62 guide element
63 recess
64a, 64b projections
66 projections
70 magazine device
72 holes
74 support/pallet
75 support plate
77 openings
78 support
79 base support
79a openings/holes
82 locking device
90 holding arrangement
92 support plate
93 recess
96 lever element
98 gripping element
D axis of rotation
B user
A1-A6 axes
W changing position
R radial direction

The invention claimed is:

1. A system for transforming plastic parisons to plastic containers with a transport device which transports the plastic parisons along a predetermined transport path, wherein the transport device has a movable station support disposed at least indirectly on a stationary base support on which a plurality of transforming stations is disposed, wherein the transforming stations each have blow mould devices which each having cavities within which the plastic parisons can be transformed into plastic containers and the blow mould devices are each disposed on blow mould supports, wherein the system has a changing device which is adapted, in a changing mode of the system, at least to remove the blow mould devices from their blow mould supports and/or to dispose blow mould devices on the blow mould supports, and wherein, during a further mode of operation which differs from the changing mode, the changing device is adapted for carrying out a treatment operation on at least one working element intended for the system, wherein the treatment operation is selected from the group consisting of a cleaning operation, a maintenance operation, a sterilising operation, and a combination thereof, and wherein the changing device has at least one treatment device adapted for treating the working element or a gripping device adapted for gripping the blow mould device wherein the treatment device is replaced by the gripping device or vice versa.

2. The system according to claim 1, wherein the gripping device is movable in at least two different directions.

3. The system according to claim 1, wherein the further mode of operation is a production mode of the system.

4. The system according to claim 1, wherein the working element is selected from the group consisting of a blow mould, a gripping element, a holding mandrel for holding the containers, a stretching rod, a blow moulding die, and a filling valve.

5. The system according to claim 1, wherein the gripping device is disposed on an arm which can swivel about at least one predetermined swivel axis.

6. The system according to claim 1, wherein the system has a housing which at least partially surrounds at least the station support and the blow mould devices and the changing device is disposed outside this housing.

7. The system according to claim 1, wherein the treatment device is a cleaning element which serves for cleaning the working element.

8. The system according to claim 1, wherein cleaning of the blow mould devices takes place by the changing device.

9. The system according to claim 1, wherein the gripping device is adapted to swivel about six axes.

10. The system according to claim 1, wherein the treatment device is a cleaning element adapted for cleaning the working element.

* * * * *